United States Patent
Ganesan et al.

(10) Patent No.: US 11,646,951 B1
(45) Date of Patent: May 9, 2023

(54) SYSTEM AND METHOD FOR PROACTIVE MANAGEMENT OF COMPONENTS BASED ON SERVICE AVAILABILITY

(71) Applicant: Dell Products L.P., Round Rock, TX (US)

(72) Inventors: Vaideeswaran Ganesan, Bangalore (IN); Shrinidhi Katte, Bangalore (IN); Sakshi Garg, Agra (IN); Sakshi Arora, Gurugram (IN); Shubhangi Srivastava, Delhi (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/871,638

(22) Filed: Jul. 22, 2022

(51) Int. Cl.
*H04L 41/5041* (2022.01)
*H04L 67/51* (2022.01)
*H04L 41/16* (2022.01)
*H04L 41/0631* (2022.01)

(52) U.S. Cl.
CPC ........ *H04L 41/5041* (2013.01); *H04L 41/064* (2013.01); *H04L 41/16* (2013.01); *H04L 67/51* (2022.05)

(58) Field of Classification Search
CPC ...... H04L 41/5041; H04L 67/51; H04L 41/16
USPC .......................................................... 709/224
See application file for complete search history.

(56) References Cited

U.S. PATENT DOCUMENTS

| | | | |
|---|---|---|---|
| 2021/0073063 A1* | 3/2021 | Kale | G06F 11/3058 |
| 2021/0303985 A1* | 9/2021 | Lakshmikantha | G06N 3/044 |

* cited by examiner

*Primary Examiner* — Adnan M Mirza
(74) *Attorney, Agent, or Firm* — Womble Bond Dickinson (US) LLP

(57) ABSTRACT

Methods and systems for managing data processing system are disclosed. A data processing system may include one or more hardware and/or software components. The operation of the data processing system may depend on the operation of these components. To manage the operation of the data processing system, future failures of the hardware components may be predicted and used as a basis for predicted services to reduce the threat of the predicted component failures. To manage performance of the predicted services, the predicted services may be scheduled for performance. To schedule performance of the predicted services, limitations on availability of service professionals that may complete the predicted services may be taken into account.

20 Claims, 5 Drawing Sheets

SYSTEM AND METHOD FOR PROACTIVE MANAGEMENT OF COMPONENTS BASED ON SERVICE AVAILABILITY

FIELD

Embodiments disclosed herein relate generally to device management. More particularly, embodiments disclosed herein relate to systems and methods to manage the operation of devices through proactive servicing.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
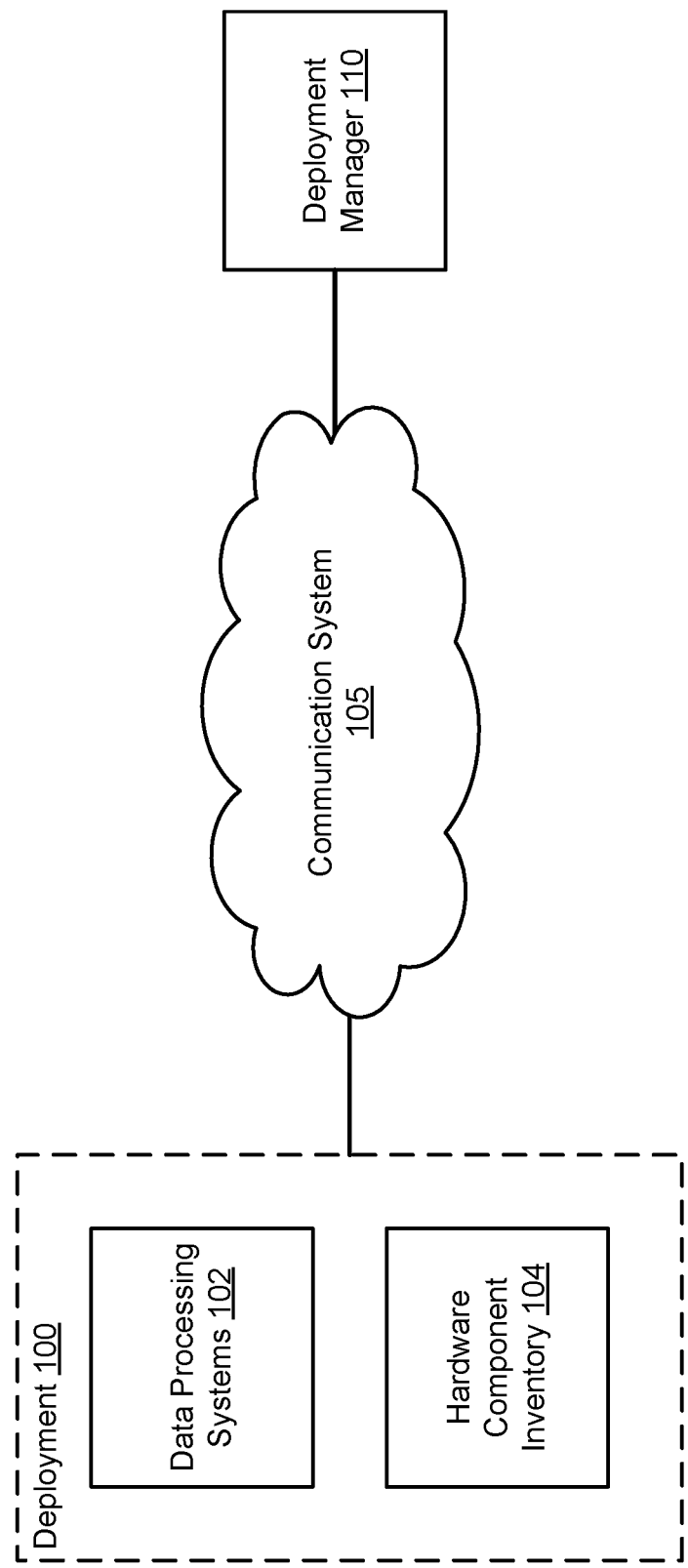
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data processing system. A data processing system may include one or more hardware and/or software components. The operation of the data processing system may depend on the operation of these components. For example, improper operation of any of these components may impair (e.g., reduce performance, reduce functionality, etc.) the operation of the data processing system.

To manage the operation of the data processing system, future failures (e.g., or improper operation, etc.) of the hardware components may be predicted and used as a basis for predicted services to address the threat of the future failures. To manage performance of the predicted services, the predicted services may be scheduled for performance. To schedule the performances of the predicted services, limitations on availability of service professionals that may complete the predicted services may be taken into account. For example, the number of services that may be completed during various service periods may be estimated, and used to schedule the predicted services so that the predicted services are both completed ahead of the predicted component failures and are within the available capabilities of the service professionals.

By doing so, a system in accordance with embodiments disclosed herein may provide a higher uptime through proactive servicing ahead of predicted component failures that may otherwise impair or prevent the data processing systems from continuing to operate (e.g., until services). The system may also have a lower cost to operate through efficient marshaling of limited available resources for completion of predicted services.

In an embodiment, a computer-implemented method for managing data processing systems using component failure predictions for the data processing systems is provided. The method may include identifying a cycle period for managing the data processing systems; identifying service periods for the cycle period, and available services for each of the service periods; for each of the service periods, identifying predicted services that will need to be performed before an end of the service period; making a determination regarding whether the predicted services during the service period exceed the available services for the service period; in a first instance of the determination where the predicted services during the service period exceed the available services for the service period: scheduling servicing of a first portion of the predicted services for completion during the service period to obtain a service schedule for the service period, and remediating a second portion of the predicted services by scheduling the second portion of the predicted services for completion in an earlier service period of the service periods to obtain an updated service schedule for the earlier service period or expanding the available services for the service period and scheduling the second portion of the predicted services for completion in the service period to obtain an updated service schedule for the service period; in a second instance of the determination where the predicted services during the service period are within the available services for the service period: scheduling servicing of the predicted services for completion during the service period to obtain the service schedule for the service period.

Identifying the available services for a service period of the service periods may include estimating a service rate for a service person (e.g., a service professional); identifying a duration of the service period; identifying a number of service persons scheduled during the service period; and calculating the available services based on the service rate, the duration, and the number of service persons.

Identifying the predicted services may include generating inferences using a trained inference model, the trained inference model being adapted to infer future hardware component failures of the data processing systems, and the inferences specifying points in time when the hardware components failures will occur.

The hardware components may be storage devices.

Scheduling the servicing of the predicted services for completion during the service period to obtain the service schedule for the service period may include rank ordering predicted services based on a likelihood of the predicted services being necessary to prevent a data processing system of the data processing systems from being impacted by a hardware component failure; sequentially scheduling the rank ordered predicted services from a highest likelihood to a lowest likelihood.

A predicted services having the highest likelihood of being necessary to prevent a data processing system of the data processing systems from being impacted by a hardware component failure may be scheduled at an earliest available servicing of the service period.

Membership of the second portion is based on a rank ordering of the predicted services may be based on a likelihood of the predicted services being necessary to prevent a data processing system of the data processing systems from being impacted by a hardware component failure.

A predicted service of the predicted services having the highest likelihood of being necessary to prevent a data processing system of the data processing systems from being impacted by a hardware component failure may be a member of the second portion.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer implemented services. The system may include deployment 100. Deployment 100 may include any number of data processing systems 102 that provide the computer implemented services. For example, deployment 100 may include one or more data processing systems 102 that may independently and/or cooperatively provide the computer implemented services.

For example, all, or a portion, of data processing systems 102 may provide computer implemented services to users and/or other computing devices operably connected to deployment 100. The computer implemented services may include any type and quantity of services including, for example, database services, instant messaging services, video conferencing services, etc. Different data processing systems may provide similar and/or different computer implemented services.

To provide the computer implemented services, deployment 100 may host applications that provide these (and/or other) computer implemented services. The applications may be hosted by one or more of data processing systems 102.

Any of data processing systems 102, and components thereof, as well as hosted entities (e.g., applications that provide computer implemented services, other applications that manage the operation of deployment 100, etc.), may use hardware components of the data processing systems 102. The hardware components may include, for example, processors, memory modules, data storage devices, network interface components (or other communication devices), and/or any other type of hardware component usable by a data processing system.

Any of the hardware components may fail or may need to be replaced for other reasons. To manage hardware component failures, deployment 100 may include hardware component inventory 104. Hardware component inventory 104 may be a collection of hardware components that may be used to replace hardware components of data processing systems 102.

To replace or otherwise service data processing systems 102, service professionals may dedicate some of their time to service the data processing systems. For example, to replace a failed hardware component, the service professional may obtain a replacement from hardware component inventory 104, suspend operation of the data processing system, replace the hardware components, and then resume operation of the data processing system (e.g., if a hot swap operation is not available, otherwise a hot swap procedure may be implemented where the data processing system may continue to operate). These tasks may take some of the service professional's limited available time to complete.

In general, embodiments disclosed herein may provide systems, devices, and methods for managing data processing systems to improve the likelihood of continued operation of data processing systems 102 in view of potential failures. To improve the likelihood of continuing the operation of data processing systems 102, the system may proactively identify likely hardware failures in the future and proactively service the data processing systems in advance of the likely hardware failures as part of a management framework. The management framework may also proactively identify limitations in the availability of service professionals, and schedule services for the data processing systems with the service professionals based on both the likely failures and limitations in the availabilities of the service professionals.

To implement the management framework, the system shown in FIG. 1 may include deployment manager 110. Deployment manager 110 may be tasked with managing deployment 100. Deployment manager 110 may manage deployment 100 by proactively completing servicing for the data processing systems to mitigate predicted future failures of the data processing systems.

To proactive complete the servicing, deployment manager 110 may (i) obtain component failure predictions for the hardware components of data processing systems 102 to identify predicted services that will need to be performed by certain deadlines, (ii) identify available services during servicing periods based on the availability of service professions and estimations of the rates at which various services are likely to be completed by the service professionals, and (iii) scheduling the predicted services ahead of the deadlines and based on the available services. By doing so, data processing systems 102 may be managed through timely servicing ahead of likely hardware component failures so that the uptime of data processing systems 102 is not reduced due to insufficient servicing of the data processing systems.

Figure 2A:
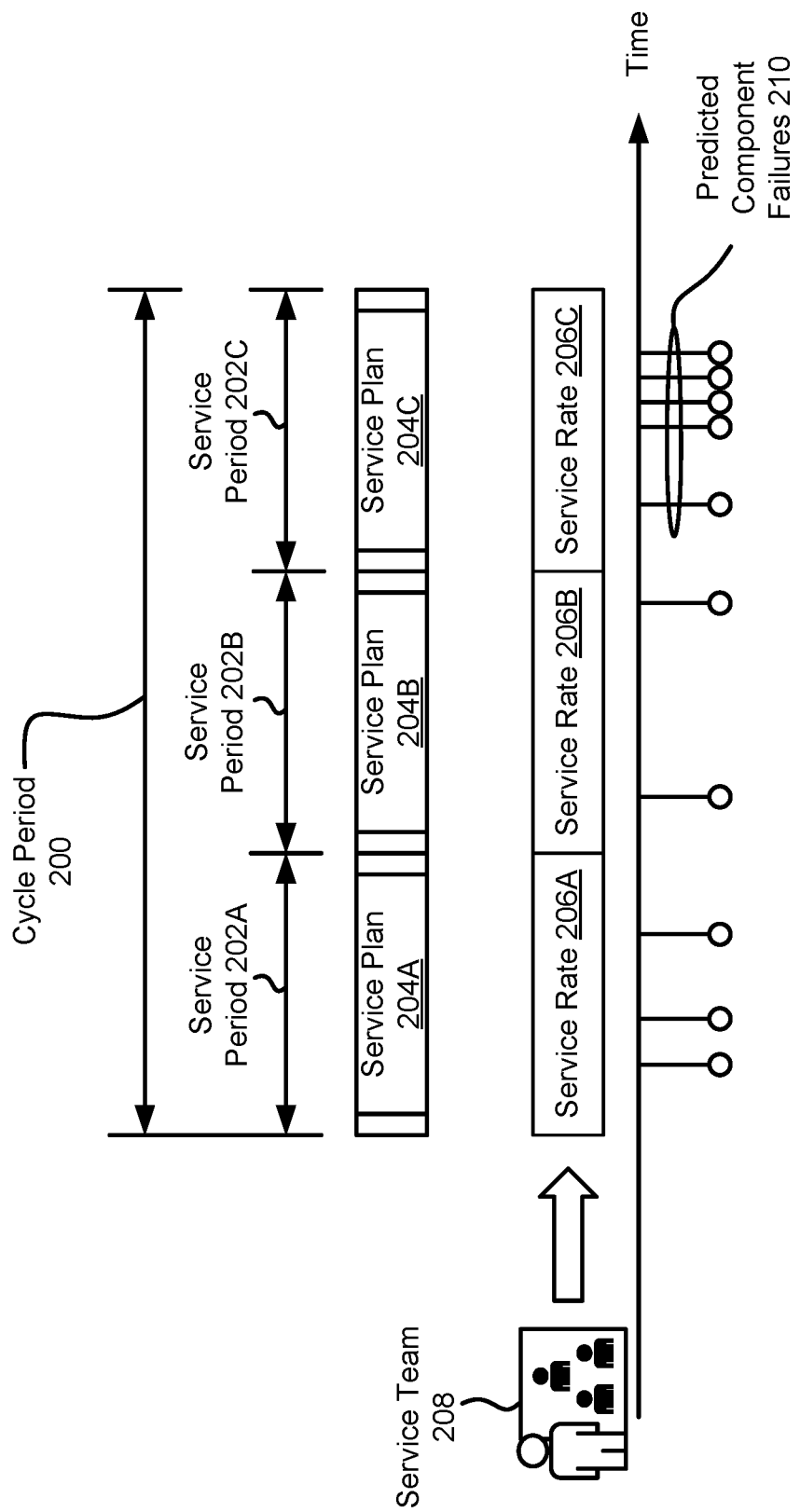
FIG. 2A shows a block diagram illustrating a cycle period in accordance with an embodiment.

The component failure predictions may be obtained via any method. For example, the component failure predictions may be obtained using an inference model (e.g., a trained neural network that predicts future hardware component failures), reading them from storage, and/or receiving them from other devices that may make the predictions. The hardware components failure predictions may include any number and type of hardware component failures for data processing systems 102. Refer to FIG. 2A for additional details regarding hardware component failures.

The predicted services may be established by (i) identifying any servicing periods where there is a delta between a number of predicted services for completion and the available services that may be completed during the service period, (ii) for service periods where there are more predicted services that may need to be performed than available services that may be performed, some of the predicted services may be shifted to earlier service periods for servicing or additional service professionals may be scheduled to expand the available services during the service period, and/or (iii) the predicted services that need to be performed may be ranked based on a likelihood of a corresponding predicted failure which the corresponding predicted services is being performed, and the predicted services that are higher ranked may be scheduled for servicing earlier than the other predicted services of lower rank.

Figure 2B:
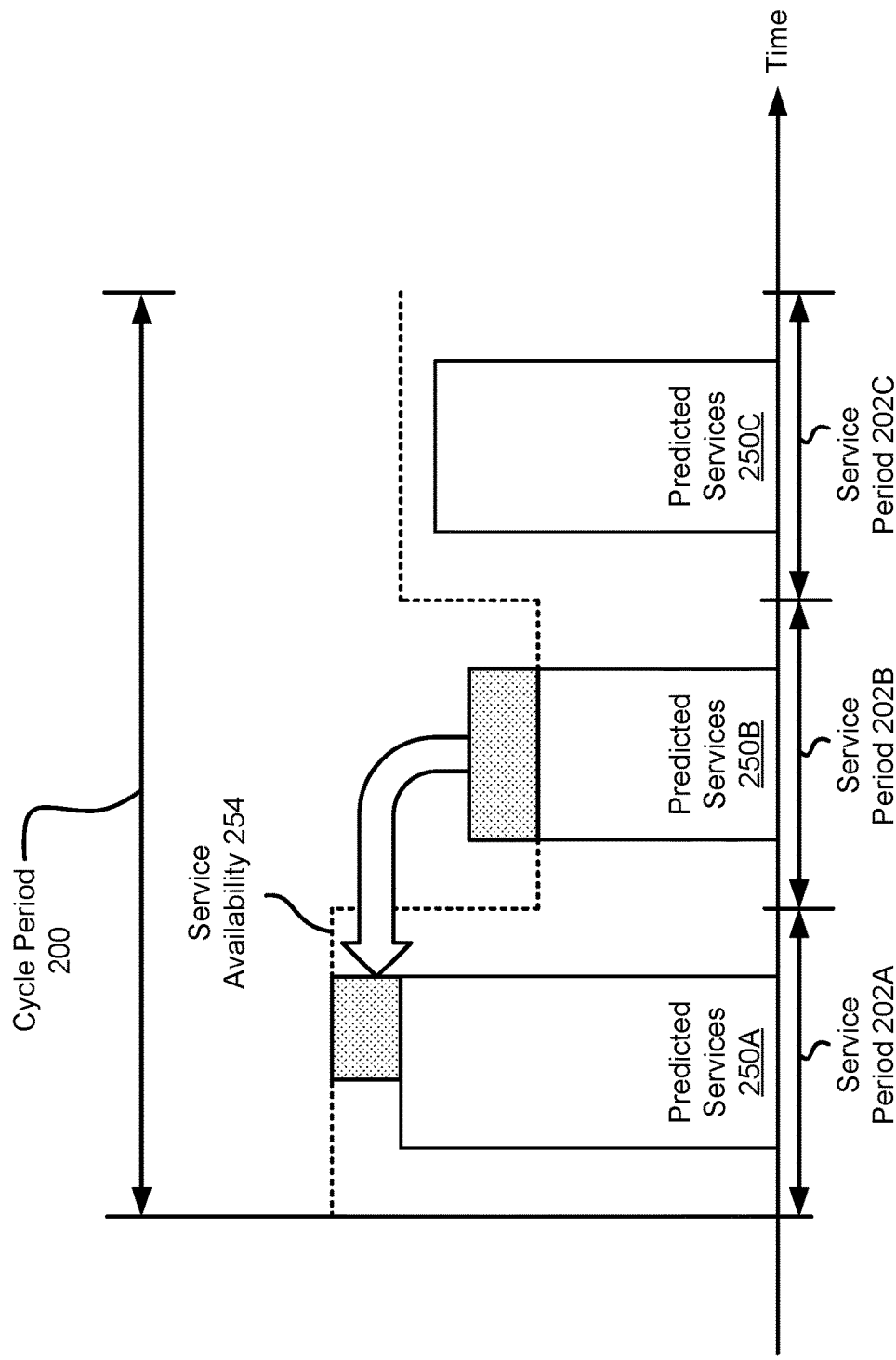
FIG. 2B shows a block diagram illustrating predicted services and available services balancing using management framework in accordance with an embodiment.

Once the predicted services are scheduled, the service professionals may be provided with copies of the schedules so that the data processing systems may be correspondingly serviced. Refer to FIG. 2B for additional details regarding scheduling servicing for data processing systems.

Figure 3:
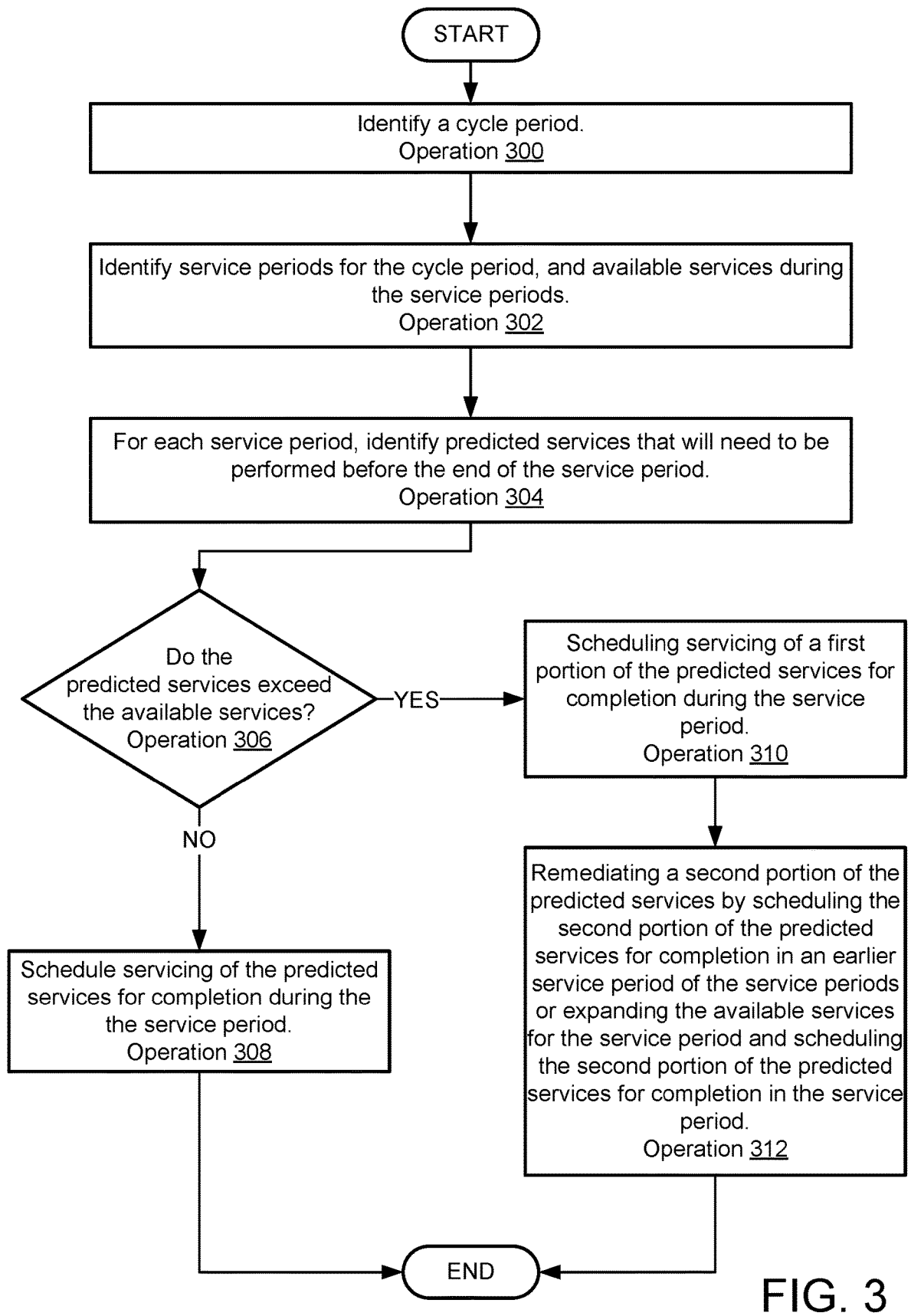
FIG. 3 shows a flow diagram illustrating a method of proactively servicing data processing systems in accordance with an embodiment.

When providing its functionality, deployment manager 110 may perform all, or a portion, of the methods and/or actions shown in FIG. 3.

Data processing systems 102 and/or deployment manager 110 may be implemented using a computing device such as a host or server, a personal computer (e.g., desktops, laptops, and tablets), a "thin" client, a personal digital assistant (PDA), a Web enabled appliance, or a mobile phone (e.g., Smartphone), an embedded system, local controllers, and/or any other type of data processing device or system. For additional details regarding computing devices, refer to FIG. 4.

Any of the components illustrated in FIG. 1 may be operably connected to each other (and/or components not illustrated) with a communication system 105. In an embodiment, communication system 105 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

Turning to FIG. 2A, a diagram illustrating a period of time during which data processing systems may need to be serviced in accordance with an embodiment is shown. In the figure, time generally proceeds from left to right on the page (e.g., along the arrow marked "Time"). Various portions of the illustrated time (e.g., 200, 202A, 202B, 202C) are indicated using the lines above the time line.

As discussed above, over time various hardware components of data processing systems may be likely to fail which may cause the data processing systems to be unable to provide services until replaced (or may be otherwise impaired or impacted). To reduce the likelihood of the data processing systems being unable to provide desired computer implemented services, the data processing systems may be proactively serviced to reduce the likelihood of predicted component failures. To do so, predicted services to proactively address predicted component failures 210 may be identified. The predicted services may be servings of the data processing systems that may make the predicted components failures less likely to occur. For example, the predicted services may include replacing hardware components, resetting hardware components, verifying/correcting software, and/or performing other in-person services or remote services managed by persons that may have limited amounts of time to perform the servicing.

Due to the complex nature of modern computing environment, any number of predicted component failures 210 may occur at any point in time resulting in any number of corresponding predicted servicing to proactively remediate the predicted component failures. The predicted component failures may include, for example, hardware devices failures such as storage devices failures (e.g., hard disk drives, tape drives, solid state disk drives, etc.). In FIG. 2A, the predicted component failures are illustrated using a limited number of indicators (e.g., three during service period 202A). However, it should be understood that any number of predicted component failures may be taken into account rather than the limited number shown in FIG. 2A, and the pattern of actual predicted component failures may be different from the pattern shown in FIG. 2A.

To manage performance of the predicted services, a planning process may be performed. The planning process may be performed for cycle period 200 which may be based, for example, on a calendar year, a month, or other period of time. Cycle period 200 may be divided into any number of service periods (e.g., 202A-202C).

Each of these service periods may be associated with a limited number of predicted services that may be completed during the service period. For example, the number of service professionals available to perform the predicted services may be limited. Consequently, service team 208 of the service professionals that may perform the predicted services may only be able to complete the predicted services at a corresponding service rate (e.g., 206A, 206B, 206C) during each of the service periods.

To manage performance of the predicted services ahead of the corresponding predicted component failures, service plans (e.g., 204A, 204B, 204C) for each of the service periods may be established. These service plans may be granular plans that specify service schedules for service team 208.

To obtain the service plans, the method illustrated in FIG. 3 may be performed. Generally, performance of the method may include identifying how many predicted services are to be completed within each service period, comparing the number of predicted services to a number that are available to be completed based on limitations imposed by service team 208, and performing one of: (i) scheduling the predicted services for completion in the service period as part of the corresponding service plan when the predicted services are fewer than the available services, (ii) scheduling some of the predicted services for completion in the service period as part of the corresponding service plan and other of the predicted services for completion in earlier service periods when the predicted services are greater than the available services for the service period, and (iii) expanding the available services for the service period and scheduling the predicted services for completion in the service period as part of the corresponding service plan when the predicted services are fewer than the available services.

Turning to FIG. 2B, a diagram illustrating service availability and predicted services in accordance with an embodiment is shown. In the figure, time generally proceeds from left to right on the page (e.g., along the arrow marked "Time").

To proactively address predicted component failures, services for data processing systems may be scheduled during service periods (e.g., 202A, 202B, 202C). During each service period, the service availability 254 may vary depending on the availability of service professionals, numbers of working days during each service periods, and/or other factors. As seen in the example cycle period 200 in FIG. 2B, service availability 254 during service period 202A may be high, drop off during service period 202B, and increase in service period 202C.

Likewise, the number of predicted services (e.g., 250A, 250B, 250C) to be completed in each service period may also vary. Consequently, there may be a difference between the number of services that may be performed during each service period and the number of predicted services for each period.

For example, in FIG. 2B, predicted services A 250A (illustrated as the unfilled box) may be less than the service availability 254 during service period 202A. In contrast, predicted services 250B (illustrated as the unfilled box below the dashed line indicating service availability 254 and the box filled with dotted infill above service availability 254) may exceed service availability 254 during service period 202B.

To address this mismatch between service availability 254 and predicted services 250B, a portion of predicted services 250B may be scheduled for completion ahead of service period 202B. For example, as indicated by the oversized arrow, the service team has some unallocated availability during service period 202A. Thus, in this example, the portion of predicted services 250B may be scheduled for completion during service period 202A. These services may be scheduled for completion during earlier service periods than illustrated in FIG. 2B without departing from embodiments disclosed herein.

Additionally, in the event that a portion of predicted services 250B needs to be scheduled during an earlier service period, this process may create a cascade in which some predicted services for an earlier service period are evicted and rescheduled during an even earlier service period.

Thus, embodiments disclosed herein may provide an improved method for proactive management of a deployment through proactive servicing. For example, by proactively servicing data processing systems ahead of predicted component failures, the uptime of the data processing systems may be improved while also marshaling limited resources for performing the proactively performed servicing of the data processing systems.

As discussed above, the components of FIG. 1 may perform various methods to increase the likelihood of data processing systems being able to provide computer implemented services through proactive servicing. FIG. 3 shows a diagram of a method that may be performed by the system of FIG. 1. In each of these figures, any of the operations may be performed in different orders, skipped, repeated, and/or be performed in a parallel or partially overlapping in time manner.

Turning to FIG. 3, a flow diagram illustrating a method of managing a deployment in accordance with an embodiment is shown. The method may be performed, for example, by a deployment manager or another component of the system shown in FIG. 1.

At operation 300, a cycle period is identified. The cycle period may be period of time for which proactive servicing will be scheduled and performed. The cycle period may be obtained by reading it from storage, receiving it as input from a user, or receiving it from another device. The cycle period may be, for example, a calendar year, a month, or another period of time.

At operation 302, service periods for the cycle period are identified. Available services for each of the service periods may also be identified. The service periods and available services may be obtained by reading them from storage, receiving them as input from a user, or receiving them from another device.

In an embodiment, the service periods are obtained procedurally. For example, the cycle period may be broken down into service periods using a formula or other automated procedure driven tool. Each of the service periods may be a portion of the cycle period. The services periods may be of similar or different duration, and may be temporally related to each other.

In an embodiment, the available services indicate how many predicted services may be completed during a corresponding service period. For example, the available services may take into account the durations of time various services take to complete, numbers of service professionals available during service periods, numbers of working days during each service period, and/or other factors which may contribute to the total number of services that may be completed during the service period. For example, the available services may be calculated by multiplying the number of available professionals, by a number of days during a week that services are performed by the professionals, and by a number of services that a person may complete during a worked day.

At operation 304, for each service period, the predicted services that will need to be performed before an end of the service period are identified. The predicted services may be identified by (i) obtaining predictions regarding component failures that will impact data processing systems, and (ii) basing the predicted services on the component failure predictions.

In an embodiment, a predicted service is identified through procedural generation from a corresponding component failure prediction. For example, a rule, formula, function, or other procedural element may take, as input, information regarding a predicted failure and output a predicted service. The procedural generation may, for example, use a time buffer to make it more likely that the predicted service, if performed, addresses the predicted component failure ahead of the failure. For example, for a given predicted component failure, the procedural generation may take the predicted date (or time period) of the failure and set the predicted service 90 days (or another duration of time) in advance of the predicted date.

The buffer used in the procedural generation may depend, for example, on the type of the predicted failure and/or a confidence level in the prediction. For example, an inference model used to generate the prediction may also provide a confidence level in the prediction or other information. Larger buffers may be employed for confidence levels that indicate that the predicted failure may occur earlier (or has some increased probability) in time than that indicated by the prediction.

The action of the predicted service may be identified, for example, through a lookup or other means. The look up or other means may take a type of the predicted failure and provide actions to be performed to proactively service a data processing system subject to the predicted failure in a manner that is likely to remediate (e.g., prevent, reduce a likelihood of occurring, push out into the future, etc.) the predicted failure.

At operation 306, a determination is made regarding whether the predicted services exceed the available services for the service period. The determination may be made by comparing the quantity of predicted services to the quantity of available services for the service period.

If it is determined that the predicted services exceed the available services then the method may proceed to operation 310 following operation 306. Otherwise, the method may proceed to operation 308.

At operation 308, the predicted services are scheduled for completion during the service period. The predicted services may be scheduled by adding them to a schedule for the service period.

In an embodiment, the predicted services are scheduled based on a likelihood of predicted component failures corresponding to the predicted services occurring. As noted above, the inference model may provide both predictions of component failures and confidence levels in the failures. Predicted services corresponding to the component failures may be rank ordered based on the likelihood of the corresponding predicted component failures occurring. The predicted services corresponding to those predicted component failures that are more likely to occur may be scheduled during earlier portions of the service period, and the predicted services corresponding to other predicted component failures that are less likely to occur may be scheduled during later portions of the service period. For example, the predicted services may be sequentially scheduled from earliest to latest during the service period based on the corresponding predicted component failure likelihoods.

The method may end following operation 308.

Returning to operation 306, the method may proceed to operation 310 following operation 306 in stances where the predicted services exceed the available services.

At operation 310, servicing of a first portion of the predicted services is scheduled for completion during the service period. As noted with respect to operation 306, the method may proceed to operation 310 only if the number of predicted services for the service period exceeds the number that may be completed during the service period. The first portion may be selected on any basis, and may include a subset of the members of the predicted services for the service period. The subset may include a quantity of the predicted services that may be completed during the service period.

In an embodiment, the first portion is selected based on the corresponding predicted component failure likelihoods discussed with respect to operation 308. The first portion may include members of the predicted services for which corresponding predicted component failures are of lower likelihood to occur. A second portion of the predicted services may have corresponding predicted component failure likelihoods that have a higher likelihood of occurring.

At operation 312, the second portion of the predicted services is remediated by either (i) scheduling the second portion of the predicted services for completion in earlier service periods (e.g., that have some available services) or (ii) expanding the available services for the service period and scheduling the second portion of the predicted services for completion in the service period. The predicted services may be scheduled by adding them to a schedule for the service period.

As discussed with respect to operation 308, the predicted services scheduled for completion during any service period may be scheduled within the service period based on the corresponding predicted component failure likelihoods. Thus, if scheduled in the earlier service period of the service period, the second portion of the predicted services may be scheduled within the corresponding service period with respect to all of the predicted services scheduled for completion during the respective service period.

The method may end following operation 312.

Thus, as illustrated above, embodiments disclosed herein may provide systems and methods usable to proactively manage data processing systems of deployments. By proactively managing servicing of data processing systems ahead of predicted component failures, the uptime of the data processing systems may be improved through reduced likelihoods of component failures occurring, as well as managing cost for servicing the data processing systems through load balancing. For example, if the available services are expanded in operation 312 through addition of professionals to a service time, authorization of overtime, or other means, significant cost may be incurred. The disclosed approach may facilitate load balancing of proactive servicing of data processing systems.

Additionally, the disclosed embodiments may be broadly applicable to a range of different scenarios. For example, events such as a hardware refresh, consolidations of resources, redeployment of resources, and/or other events that may indicate significant changes in the need for servicing may be addressed through integration or supplementation of additional predicted services. Any of these events may be viewed as predictions of needs for future servicing for data processing systems of a deployment.

Figure 4:
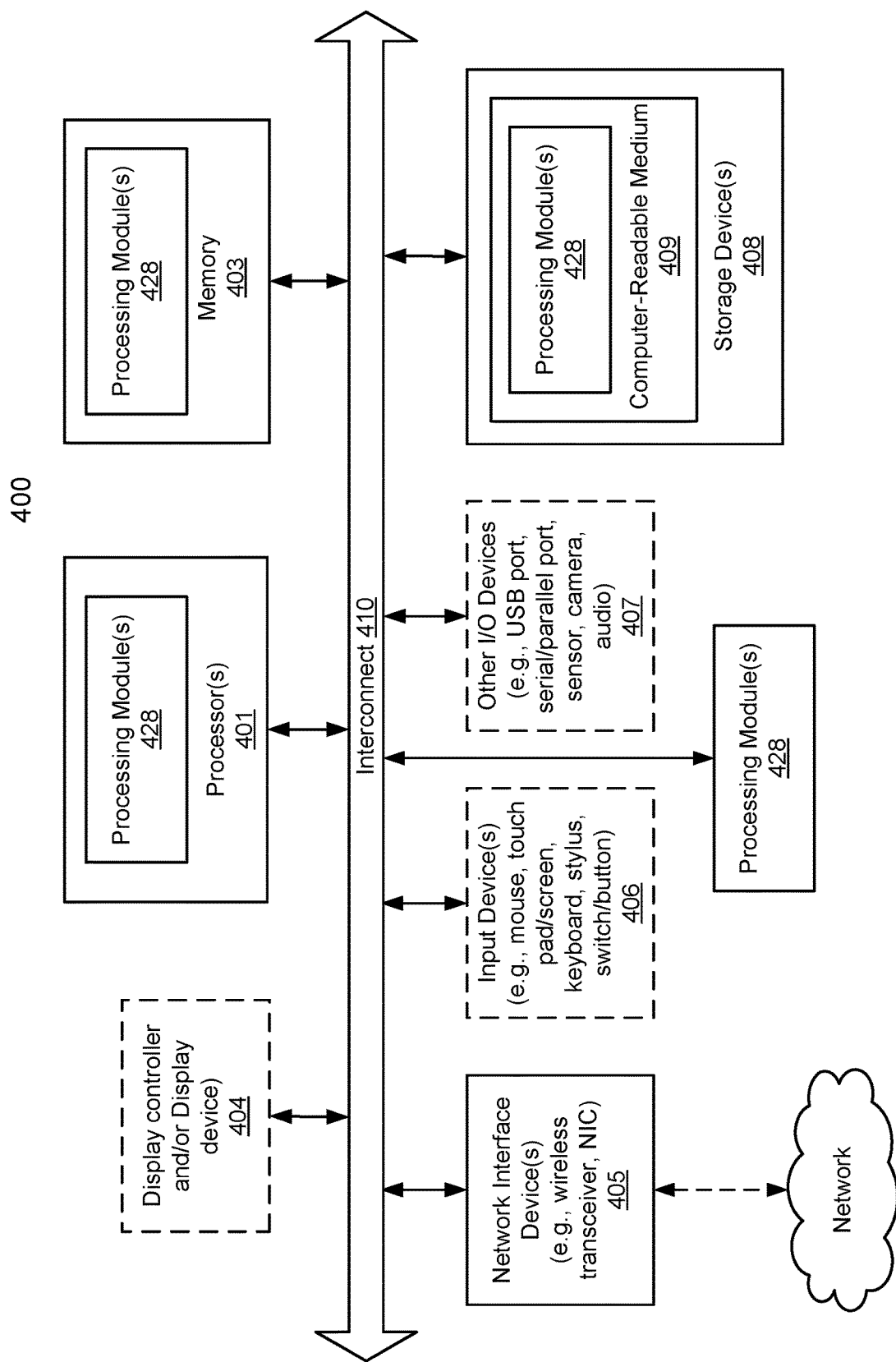
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A computer-implemented method for managing data processing systems using component failure predictions for the data processing systems, the method comprising:
identifying a cycle period for managing the data processing systems;
identifying service periods for the cycle period, and available services for each of the service periods;
for each of the service periods, identifying predicted services that will need to be performed before an end of the service period;
making a determination regarding whether the predicted services during the service period exceed the available services for the service period;
in a first instance of the determination where the predicted services during the service period exceed the available services for the service period:
scheduling servicing of a first portion of the predicted services for completion during the service period to obtain a service schedule for the service period, and
remediating a second portion of the predicted services by scheduling the second portion of the predicted services for completion in an earlier service period of the service periods to obtain an updated service schedule for the earlier service period or expanding the available services for the service period and scheduling the second portion of the predicted services for completion in the service period to obtain an updated service schedule for the service period;
in a second instance of the determination where the predicted services during the service period are within the available services for the service period:
scheduling servicing of the predicted services for completion during the service period to obtain the service schedule for the service period.

2. The computer-implemented method of claim 1, wherein identifying the available services for a service period of the service periods comprises:
estimating a service rate for a service person;
identifying a duration of the service period;
identifying a number of service persons scheduled during the service period; and
calculating the available services based on the service rate, the duration, and the number of service persons.

3. The computer-implemented method of claim 1, wherein identifying the predicted services comprises:
generating inferences using a trained inference model, the trained inference model being adapted to infer future hardware component failures of the data processing systems, and the inferences specifying points in time when the hardware components failures will occur.

4. The computer-implemented method of claim 3, wherein the hardware components comprise storage devices.

5. The computer-implemented method of claim 1, wherein scheduling the servicing of the predicted services for completion during the service period to obtain the service schedule for the service period comprises:
rank ordering predicted services based on a likelihood of the predicted services being necessary to prevent a data processing system of the data processing systems from being impacted by a hardware component failure;
sequentially scheduling the rank ordered predicted services from a highest likelihood to a lowest likelihood.

6. The computer-implemented method of claim 5, wherein a predicted services having the highest likelihood of being necessary to prevent a data processing system of the data processing systems from being impacted by a hardware component failure is scheduled at an earliest available servicing of the service period.

7. The computer-implemented method of claim 1, wherein membership of the second portion is based on a rank ordering of the predicted services based on a likelihood of the predicted services being necessary to prevent a data processing system of the data processing systems from being impacted by a hardware component failure.

8. The computer-implemented method of claim 7, wherein a predicted service of the predicted services having the highest likelihood of being necessary to prevent a data processing system of the data processing systems from being impacted by a hardware component failure is a member of the second portion.

9. A non-transitory machine-readable medium having instructions stored therein, which when executed by a processor, cause the processor to perform operations for managing data processing systems using component failure predictions for the data processing systems, the operations comprising:
identifying a cycle period for managing the data processing systems;
identifying service periods for the cycle period, and available services for each of the service periods;
for each of the service periods, identifying predicted services that will need to be performed before an end of the service period;
making a determination regarding whether the predicted services during the service period exceed the available services for the service period;
in a first instance of the determination where the predicted services during the service period exceed the available services for the service period:
scheduling servicing of a first portion of the predicted services for completion during the service period to obtain a service schedule for the service period, and
remediating a second portion of the predicted services by scheduling the second portion of the predicted services for completion in an earlier service period of the service periods to obtain an updated service schedule for the earlier service period or expanding the available services for the service period and scheduling the second portion of the predicted services for completion in the service period to obtain an updated service schedule for the service period;
in a second instance of the determination where the predicted services during the service period are within the available services for the service period:
scheduling servicing of the predicted services for completion during the service period to obtain the service schedule for the service period.

10. The non-transitory machine-readable medium of claim 9, wherein identifying the available services for a service period of the service periods comprises:
estimating a service rate for a service person;
identifying a duration of the service period;
identifying a number of service persons scheduled during the service period; and
calculating the available services based on the service rate, the duration, and the number of service persons.

11. The non-transitory machine-readable medium of claim 9, wherein identifying the predicted services comprises:
generating inferences using a trained inference model, the trained inference model being adapted to infer future hardware component failures of the data processing systems, and the inferences specifying points in time when the hardware components failures will occur.

12. The non-transitory machine-readable medium of claim 11, wherein the hardware components comprise storage devices.

13. The non-transitory machine-readable medium of claim 9, wherein scheduling the servicing of the predicted services for completion during the service period to obtain the service schedule for the service period comprises:
rank ordering predicted services based on a likelihood of the predicted services being necessary to prevent a data processing system of the data processing systems from being impacted by a hardware component failure;
sequentially scheduling the rank ordered predicted services from a highest likelihood to a lowest likelihood.

14. The non-transitory machine-readable medium of claim 13, wherein a predicted services having the highest likelihood of being necessary to prevent a data processing system of the data processing systems from being impacted by a hardware component failure is scheduled at an earliest available servicing of the service period.

15. The non-transitory machine-readable medium of claim 9, wherein membership of the second portion is based on a rank ordering of the predicted services based on a likelihood of the predicted services being necessary to prevent a data processing system of the data processing systems from being impacted by a hardware component failure.

16. A data processing system, comprising:
a processor; and
a memory coupled to the processor to store instructions, which when executed by the processor, cause the processor to perform operations for managing data processing systems using component failure predictions for the data processing systems, the operations comprising:
identifying a cycle period for managing the data processing systems;
identifying service periods for the cycle period, and available services for each of the service periods;
for each of the service periods, identifying predicted services that will need to be performed before an end of the service period;
making a determination regarding whether the predicted services during the service period exceed the available services for the service period;
in a first instance of the determination where the predicted services during the service period exceed the available services for the service period:

scheduling servicing of a first portion of the predicted services for completion during the service period to obtain a service schedule for the service period, and remediating a second portion of the predicted services by scheduling the second portion of the predicted services for completion in an earlier service period of the service periods to obtain an updated service schedule for the earlier service period or expanding the available services for the service period and scheduling the second portion of the predicted services for completion in the service period to obtain an updated service schedule for the service period;

in a second instance of the determination where the predicted services during the service period are within the available services for the service period:

scheduling servicing of the predicted services for completion during the service period to obtain the service schedule for the service period.

17. The data processing system of claim 16, wherein identifying the available services for a service period of the service periods comprises:

estimating a service rate for a service person;
identifying a duration of the service period;
identifying a number of service persons scheduled during the service period; and
calculating the available services based on the service rate, the duration, and the number of service persons.

18. The data processing system of claim 16, wherein identifying the predicted services comprises:

generating inferences using a trained inference model, the trained inference model being adapted to infer future hardware component failures of the data processing systems, and the inferences specifying points in time when the hardware components failures will occur.

19. The data processing system of claim 18, wherein the hardware components comprise storage devices.

20. The data processing system of claim 16, wherein scheduling the servicing of the predicted services for completion during the service period to obtain the service schedule for the service period comprises:

rank ordering predicted services based on a likelihood of the predicted services being necessary to prevent a data processing system of the data processing systems from being impacted by a hardware component failure;
sequentially scheduling the rank ordered predicted services from a highest likelihood to a lowest likelihood.

* * * * *